United States Patent
Navarro et al.

(10) Patent No.: US 10,710,917 B2
(45) Date of Patent: Jul. 14, 2020

(54) SYSTEM AND METHODS FOR WATER TREATMENT

(71) Applicant: Unlimited Water Solutions LLC, Copperas Cove, TX (US)

(72) Inventors: Oscar Ricardo Garcia Navarro, Beaumont, TX (US); Roberto Ariel Salinas Perez, Beaumont, TX (US); Jennifer Leahann Teeter, Copperas Cove, TX (US)

(73) Assignee: UNLIMITED WATER SOLUTIONS LLC, Copperas Cove, TX (US)

( * ) Notice: Subject to any disclaimer, the term of this patent is extended or adjusted under 35 U.S.C. 154(b) by 0 days.

(21) Appl. No.: 15/739,209

(22) PCT Filed: Nov. 4, 2016

(86) PCT No.: PCT/US2016/060663
§ 371 (c)(1),
(2) Date: Dec. 22, 2017

(87) PCT Pub. No.: WO2017/079645
PCT Pub. Date: May 11, 2017

(65) Prior Publication Data
US 2018/0179097 A1  Jun. 28, 2018

Related U.S. Application Data

(60) Provisional application No. 62/252,253, filed on Nov. 6, 2015, provisional application No. 62/252,312, filed on Nov. 6, 2015.

(51) Int. Cl.
*C02F 9/00* (2006.01)
*C02F 1/00* (2006.01)
(Continued)

(52) U.S. Cl.
CPC ............. *C02F 9/00* (2013.01); *C02F 1/008* (2013.01); *C02F 9/005* (2013.01); *C02F 1/002* (2013.01);
(Continued)

(58) Field of Classification Search
None
See application file for complete search history.

(56) References Cited

U.S. PATENT DOCUMENTS

| 6,180,014 | B1 | 1/2001 | Salama |
| 6,346,197 | B1 * | 2/2002 | Stephenson ............. C02F 1/463 204/242 |

(Continued)

FOREIGN PATENT DOCUMENTS

| JP | 2000015260 A | 1/2000 |
| WO | 2015176137 A1 | 11/2015 |

OTHER PUBLICATIONS

Derwent-Acc-No: 2003-469165, Dewent week: 200345, Mar. 25, 2003. (Year: 2003).*

*Primary Examiner* — Ana M Fortuna
(74) *Attorney, Agent, or Firm* — Slater Matsil, LLP

(57) ABSTRACT

An embodiment method includes generating a first water product and a sludge of contaminants from water to be treated using an advanced electronic-oxidation process. The advanced electronic-oxidation process includes an electronic treatment comprising a combination of electrocoagulation, electro-flocculation, electro-chlorinator, and electro-dialysis operated in synchronization with ozone. The method further includes separating the sludge of contaminants from the first water product using a filtration process, and filtering the first water product to produce a second water product and a concentrated water byproduct. The filtering includes a first sub-stage to remove particles greater than 0.02 μm to about 0.05 μm followed by a second (Continued)

sub-stage that includes a reverse osmosis process or a nano-filtration process. The second water is exposed product to an ultraviolet light treatment or ozonation process to generate clean water.

20 Claims, 2 Drawing Sheets

(51) Int. Cl.
| | |
|---|---|
| *C02F 101/20* | (2006.01) |
| *C02F 101/10* | (2006.01) |
| *C02F 1/465* | (2006.01) |
| *C02F 101/30* | (2006.01) |
| *C02F 1/44* | (2006.01) |
| *C02F 1/32* | (2006.01) |
| *C02F 1/463* | (2006.01) |
| *C02F 1/467* | (2006.01) |
| *C02F 1/469* | (2006.01) |
| *C02F 1/66* | (2006.01) |
| *C02F 1/78* | (2006.01) |
| *C02F 103/10* | (2006.01) |

(52) U.S. Cl.
CPC ................ *C02F 1/32* (2013.01); *C02F 1/44* (2013.01); *C02F 1/441* (2013.01); *C02F 1/442* (2013.01); *C02F 1/463* (2013.01); *C02F 1/465* (2013.01); *C02F 1/4672* (2013.01); *C02F 1/4674* (2013.01); *C02F 1/4693* (2013.01); *C02F 1/66* (2013.01); *C02F 1/78* (2013.01); *C02F 2101/10* (2013.01); *C02F 2101/101* (2013.01); *C02F 2101/20* (2013.01); *C02F 2101/30* (2013.01); *C02F 2103/10* (2013.01); *C02F 2201/4614* (2013.01); *C02F 2201/4616* (2013.01); *C02F 2201/782* (2013.01); *C02F 2209/001* (2013.01); *C02F 2209/03* (2013.01); *C02F 2209/05* (2013.01); *C02F 2209/06* (2013.01); *C02F 2209/11* (2013.01); *C02F 2301/046* (2013.01)

(56) References Cited

U.S. PATENT DOCUMENTS

| | | | |
|---|---|---|---|
| 9,296,629 B2 * | 3/2016 | Van Vliet | C02F 1/68 |
| 2003/0140940 A1 | 7/2003 | Meldrum | |
| 2003/0173300 A1 | 9/2003 | Bradley | |
| 2004/0099599 A1 | 5/2004 | Van Vliet et al. | |
| 2004/0251213 A1 * | 12/2004 | Bradley | C02F 1/463 |
| | | | 205/676 |
| 2006/0027463 A1 | 2/2006 | Lavelle et al. | |
| 2007/0158276 A1 | 7/2007 | Markle | |
| 2008/0053822 A1 | 3/2008 | Miyahara et al. | |
| 2009/0107915 A1 | 4/2009 | Skinner et al. | |
| 2009/0314659 A1 | 12/2009 | Field | |
| 2011/0011801 A1 * | 1/2011 | Cho | C02F 1/4602 |
| | | | 210/651 |
| 2011/0233070 A1 * | 9/2011 | Machuca Martinez | |
| | | | C02F 1/463 |
| | | | 205/688 |
| 2013/0075332 A1 | 3/2013 | Prakash et al. | |
| 2013/0118994 A1 | 5/2013 | Altman | |
| 2013/0161262 A1 * | 6/2013 | Henley | C02F 9/00 |
| | | | 210/695 |
| 2013/0341267 A1 * | 12/2013 | Prasad | C02F 9/00 |
| | | | 210/605 |
| 2014/0374236 A1 * | 12/2014 | Moore | C05F 7/00 |
| | | | 204/155 |
| 2015/0166383 A1 | 6/2015 | Visnja et al. | |
| 2017/0107137 A1 * | 4/2017 | Jung | C25B 1/285 |
| 2017/0217809 A1 * | 8/2017 | Laurence | C02F 9/005 |
| 2018/0179097 A1 * | 6/2018 | Navarro | C02F 9/005 |
| 2018/0186671 A1 * | 7/2018 | Perez | C02F 9/005 |
| 2018/0230026 A1 * | 8/2018 | Raynel | C02F 1/463 |

* cited by examiner

SYSTEM AND METHODS FOR WATER TREATMENT

CROSS-REFERENCE TO RELATED APPLICATIONS

This application is a national phase filing under section 371 of PCT/US2016/060663, filed on Nov. 4, 2016, which claims the benefit of U.S. Provisional Application No. 62/252,312, filed on Nov. 6, 2015 and U.S. Provisional Application No. 62/252,253, filed on Nov. 6, 2015, which applications are hereby incorporated herein by reference This application is related to International Patent Application filed on Nov. 4, 2016 and entitled "Electronic Water Pre-Treatment Equipment and Methods" PCT/US16/60697, which application is hereby incorporated herein by reference.

TECHNICAL FIELD

The present invention relates generally to a system and method of water treatment and, in particular embodiments, to a system and method of water treatment that includes a membrane system and an electro-oxidation process.

BACKGROUND

Water is a crucial resource that, at times, may be considered a scarce resource. In many areas, especially the Southwest of the United States, local communities have to make hard choices of either supplying water for domestic consumption or supplying water to industries such as agriculture. The decision may not be easy, as communities balance their need to grow their local economies while managing scarce resources.

Reclaiming waste water and rendering the water suitable for re-use and/or disposal may ameliorate the problem of scarce water. There are many ways to clean water, but most communities rely on a few methods that combine coagulation, particle settling, filtration, and disinfection. While such wastewater treatments methods may be effective to clean common types of wastewaters, such methods may be ineffective when treating waters resulting from certain industrial processes. For example, industrial processes such as hydraulic fracturing may add toxic contaminants and toxic chemicals to wastewaters. Not properly treating contaminated wastewater may be costly to the environment.

SUMMARY

In an embodiment, a method includes generating a first water product and a sludge of contaminants from water to be treated using an advanced electronic-oxidation process; separating the sludge of contaminants from the first water; and filtering the first water product through a membrane structure to produce a second water product.

In an embodiment, a system includes an advanced electronic-oxidation stage configured to treat raw water and generate a first water product and a sludge of contaminants; a filter configured to separate the sludge of contaminants from the first water product; and a membrane structure configured to filter the first water product to produce a second water product.

In an embodiment, a system includes a water pre-treatment stage and a water treatment stage. The water pre-treatment stage includes a first filter configured to filter raw water; an advanced electronic-oxidation stage configured to treat the raw water and generate a first water product and a sludge of contaminants; and a second filter configured to separate the sludge of contaminants from the first water product. The water treatment stage includes a membrane structure configured to filter the first water product to produce a second water product.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present disclosure describes preferred embodiments in a specific context, a system and method of water treatment including a membrane system and an electronic-oxidation process in various configurations and in specific examples of wastewater to be treated and clean water to be obtained. Embodiments of the present invention may also be used in alternative configurations as well as in treating other types of wastewater and in targeting different types of clean water to be obtained.

Wastewater from industries may contain significant amounts of toxic material. These toxic materials may be present in the wastewater as total suspended solids (TSS), Total Dissolved Solids (TDS), Biological Oxidation Demand (BOD), Turbidity, Chemical Oxidation Demand (COD), organic compounds, biological material, etc., all of which may need to be removed from the water in order to categorize the water as safe.

Suspended solid particles like emulsified oil droplets and mineral colloidal material may have a size ranging from a few nanometers to a few millimeters. Suspended solid particles may give the water a cloudy and turbid appearance, which is measured in terms of nephelometric turbidity units (NTU). NTU is a measure of the clarity of the water and the amount of suspended materials.

Water with turbidity as high as 1 NTU may be classified as drinking water. Water resulting from industrial process, however, may have turbidity higher than 50 NTU. Determining a safe level of turbidity, however, may not be sufficient to classify water as safe. For example, some toxic elements, such as dissolved toxic chemicals or biological organisms may be present in water with a turbidity level below 1 NTU. Such materials may render the water unsuitable for consumption or even reintroduction to the environment.

Figure 1:
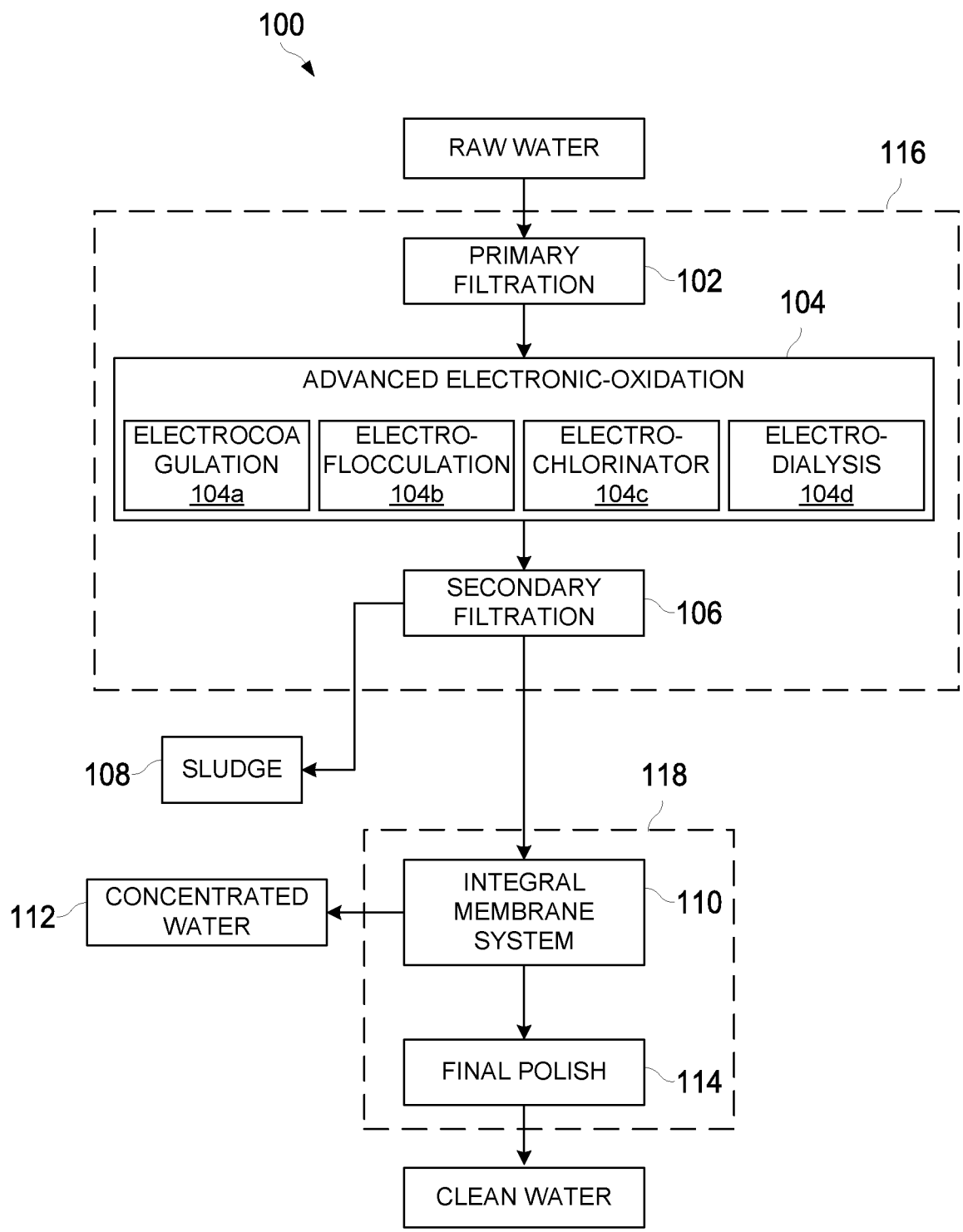
FIG. 1 illustrates a water treatment system, in accordance with an embodiment.

FIG. 1 illustrates water treatment system 100, in accordance with an embodiment. Water treatment system 100 receives raw water and produces clean water after subjecting the raw water to pre-treatment and treatment. Water treatment system 100 includes pre-treatment stage 116 and treatment stage 118. In some embodiments, pre-treatment stage 116 may be used to treat raw water to remove harmful pollutants, and in so doing, produce sludge 108 that may be subsequently discharged to a sewer system. The sludge generated is not toxic due to a free chemical and no microbe water treatment process used. In such embodiments, treatment stage 118 may continue treatment of water that has separated from sludge 108.

Pre-treatment stage 116 includes primary filtration stage 102, advanced electronic-oxidation stage 104, and secondary filtration stage 106. Primary filtration stage 102 may be configured to remove particles with sizes greater than a predetermined value from the raw water. In other words, the water produced at the output of primary filtration stage 102 may not contain particle greater than such predetermined value. For example, particles greater than 250 um may be removed by primary filtration stage 102. As another example, a range for the predetermined value of particle size to be removed by primary filtration stage 102 may be between about 100 μm and about 250 μm, although other threshold particle sizes may be possible in other embodiments.

The process used by primary filtration stage 102 to remove particles may be mechanical in nature. For example, a semi-permeable membrane or a fine screen filter with holes smaller than the predetermined value may be used. Primary filtration stage 102, therefore, may be thought of as a separation process, in which suspended solids and other molecules with sizes greater than the predetermined value are separated from the rest of the liquid flowing through a mechanical barrier. The suspended solids and other molecules may be later discarded through one or more processes known in the art.

In some embodiments, raw water may include, or may be, a mixture of two or more immiscible liquids (e.g. oil and water), and this gives raw water the appearance of a liquid-liquid dispersion. In such cases, primary filtration stage 102 may include a liquid/liquid separator, which may include a knitted wire mesh, one or more coalescing cartridges, one or more separator cartridges, or a combination thereof. Methods utilized by the liquid/liquid separator to separate the liquid-liquid dispersion include gravity settling, enhance-gravity settling, coalescing, centrifugal force, and electrical charge.

Pre-treatment stage 116 also includes advanced electronic-oxidation stage 104, which is configured to remove specific elements from the water it receives. In some embodiments, advanced electronic-oxidation stage 104 may be realized in a reaction chamber (e.g., in a pipe of a reaction chamber). Advanced electronic-oxidation stage 104 utilizes an electronic treatment (a combination of electrocoagulation 104a, electro-flocculation 104b, electro-chlorinator 104c, and electro-dialysis 104d using custom electric signal) operated in synchronization with ozone to generate particles that attach to specific elements or particles to be removed from the incoming water. Configurable electrical waveforms are used to optimize the process. For example, an electrical current having a square-wave, sawtooth shape, PWM, PAM may be passed through the incoming water to induce a chemical reaction that cleans the incoming water. Once the chemical reaction occurs, the newly formed particles may float or precipitate. Such reactions may produce particles with sizes greater than 1 um, and that are typically larger than 25 um depending on the particular particles being targeted. Flocculants generated through this process may be charged with free radicals that create hyper oxidation, which may be beneficial in the treatment of wastewater having heavy metals and organic materials. For example, advanced electronic-oxidation stage 104 may be effective in removing heavy metals, polymers, sulfates, carbonates and salts.

The electro-oxidation process of advanced electro-oxidation stage 104, by its nature, tends to produce water having a neutral pH. As a result, advanced electronic-oxidation stage 104 may be capable of processing water with a pH between about 5 and about 8 without chemical pre-treatment, while generating water with a pH closer to neutral. For example, when advanced electronic-oxidation stage 104 receives water with a pH of about 5, advanced electronic-oxidation stage 104 may produce water with a pH of about 7. In some embodiments, advanced electronic-oxidation stage 104 may include a conditioning process that conditions the water to be treated with a pH treatment. Such a conditioning process may be used in response to water, received at advanced electronic-oxidation stage 104, having outside the aforementioned range of about 5 to about 8. For example, when advanced electronic-oxidation stage 104 receives water with a pH of 3, a pH adjustment may need to be done, and this can be accomplished with caustic soda (NaOH) to raise the level of pH to 5, to allow advanced electronic-oxidation stage 104 operate properly and may produce water with a pH of about 7. When advanced electronic-oxidation stage 104 receives water with a pH of 10, a pH adjustment may need to be done, and this can be accomplished with Hydrochloric Acid (HCl) to reduce the level of pH to 8, to allow advanced electronic-oxidation stage 104 operate properly and may produce water with a pH of about 7.

Advanced electronic-oxidation stage 104 operates without using synthetic polymers or organic polymers and it may avoid the introduction of micro-organisms to aid in the treatment in the water. In that regard, advanced electronic-oxidation stage 104 may be considered as a chemical-free or a no-microbe process. The ozone used by advanced electronic-oxidation stage 104 may be generated in-situ by the use of electrolysis or other methods known in the art.

Pre-treatment stage 116 also includes secondary filtration stage 106, which is configured to remove particles with sizes greater than a predetermined value from the raw water. Secondary filtration stage 106 may operate in a similar manner as primary filtration stage 102. Secondary filtration stage 106, however, may have a smaller predetermined value for the size of particles that it allows through. Secondary filtration stage 106 may, for example, remove particles greater than 1 um. A typical range may be from 1 um to 25 um, but other values may be used. Microfiltration (MF) may be used during secondary filtration stage 106. Secondary filtration stage 106 may produce sludge 108, which may be discarded.

In some cases, the quality of the raw water may be highly variable in terms of TDS, TSS and turbidity. Since pre-treatment stage 116 removes a significant amount of contaminants and automatically adjusts the pH of the water, the quality of water produced by integral membrane system stage no, and by water treatment system 100 as a result, tends to be approximately constant, even as the raw water changes in composition. Water produced by pre-treatment stage 116 is provided to treatment stage 118, which includes integral membrane system stage no and final polish stage 114.

Integral membrane system stage no may be configured to remove ions and large molecules from water. Integral membrane system no may include sub-stages, such as MF, ultrafiltration (UF), nanofiltration (NF), reverse osmosis (RO), or a combination thereof. Integral membrane system stage no may produce concentrated water 112, which contains the particles removed from the water by integral membrane system stage no and which may be later discarded or used for alternative purposes. For example, concentrated water (e.g. brine) may be used in the oil industry for processes such as horizontal fracturing.

Membranes used in an MF stage may have pore sizes ranging from about 0.1 um to about 0.35 um. In other words, an MF stage may remove particles greater than a predetermined size that ranges from about 0.1 um to about 0.35 um. Membranes used in a UF stage may have pore sizes ranging from about 0.02 μm to about 0.05 μm (about 20,000 to 750,000 Daltons). Membranes used in an NF stage may be smaller than about 0.01 um.

If more than one sub-stage is used, the order in which the sub-stages are configured may be optimized depending on the quality of water received by integral membrane system stage no and by the desired quality of water to be obtained. In this case, the quality is measured by sensors in situ (pH, TDS, TSS, Flow, Pressure and Temperature Sensors). Also measured with periodical water analysis by a lab kit (Hardness, Alkalinity, Oils, Sulfides, Chlorides, Heavy metals, etc.). For example, an MF or UF sub-stage may be placed prior to an RO or NF sub-stage. Several effects may be achieved by placing an MF or UF sub-stage prior to an RO or NF sub-stage. Filtrate (e.g. product water) quality of a RO or NF with MF or UF sub-stage is better in comparison to an RO or NF working alone. As an example, the water received by the RO or NF sub-stage may have little or no amount of heavy metals, polymers, additives, sulfates, carbonates, salts, fats, oils, and hydrocarbons in general. As a result, the RO or NF sub-stage may be more effective, run more efficiently, and with lower maintenance cost. Additionally, colloidal fouling load of the RO and NF sub-stage may be reduced, achieving significantly lower silt density index (SDI) and turbidity as well as low levels of TSS, which may be lower than 10 mg/l of water.

Furthermore, since the water received by the RO or NF sub-stage has a lower contaminant content than it would otherwise have without the MF or UF sub-stage, filter cleaning frequencies due to colloidal fouling in the subsequent RO or NF stage may also be reduced. Additionally, filtrate quality of a MF or UF sub-stage remains more constant than an RO or NF sub-stage since the MF or UF sub-stage may be considered an absolute membrane barrier, which is true even for wastewater sources afflicted by rapidly fluctuating quality. Even further, a MF or UF sub-stage may require less time to operate and have easier operation requirements compared to conventional filtration processes, thereby resulting in longer operating life and reduced maintenance cost.

MF and UF membranes of the MP or UF sub-stage may have different configurations and shapes. For example, MF and UF membranes may be spiral wound flat sheets, hollow fiber, tubular, or plate-and-frame. A predetermined amount of water pressure may be applied to allow water to flow through the membranes used in a particular filter stage of integral membrane system 110. Typical operations transmembrane pressures (TMP) may range from 3 to 30 psi. The TMP of a system may vary according to different system parameters. For example, a higher TMP may result from smaller pore sizes, higher flux rates, colder water temperatures, and when fouling occurs. By using a MF or UF sub-stage prior to an NF or RO sub-stage, the psi used by water treatment system 100 may be reduced by, for example, reducing or preventing the occurrence of fouling. A lower psi may be associated with lower energy consumption.

Treatment stage 118 includes final polish stage 114, which is configured to customize the clean water depending on the use. For example, ultraviolet (UV) light treatment or ozonation (O3) may be used in this stage to add an additional level of microorganism removal to ensure water safety. A mineral and alkalinity adjustment may also be applied in this stage to make water healthier and tastier for human consumption.

Advantages of some embodiments of the present invention include that a dead-end flow mode of operation is possible. In other words, water treatment system 100 may be implemented with a feed flow (e.g. raw water) and a filtrate flow (e.g. clean water or product water), without requiring a reject flow (e.g. water with concentrated contaminants that were rejected by the process) or flows from additional chemicals.

Water treatment system 100 may be implemented as a portable solution as well as a fixed solution, and multiple water treatment systems 100 may be configured in parallel to increase the clean water production. For example, a portable solution of the size of a camping bag-pack capable of producing 1 gallon of clean water per day and incorporating primary filtration 102, advanced electro-oxidation stage 104, secondary filtration stage 106, integral membrane system stage no and final polish stage 114 as well as ozone generation may be implemented. Such a solution may be used, for example, by households in urban and rural settings. Water treatment system 100 may be implemented in a trailer or cheap container (CCAN) with a size of 8×20×8 feet, which may produce 1,000 barrels of clean water per day. Similarly, water treatment system 100 may be implemented in a trailer with a size of 8×53×8 feet, which may produce 5,000 barrels of clean water per day. A fixed implementation of water treatment system 100 capable of producing 120,000 barrels of clean water per day may occupy a building of the size of 40×60 feet.

Advantage of some embodiments of the present invention include that the water treatment system may operate without the addition of chemicals or other components and, therefore, may be located in the point of use. Such implementation may eliminate the need for expensive off-site treatment of waste fluids.

Figure 2:
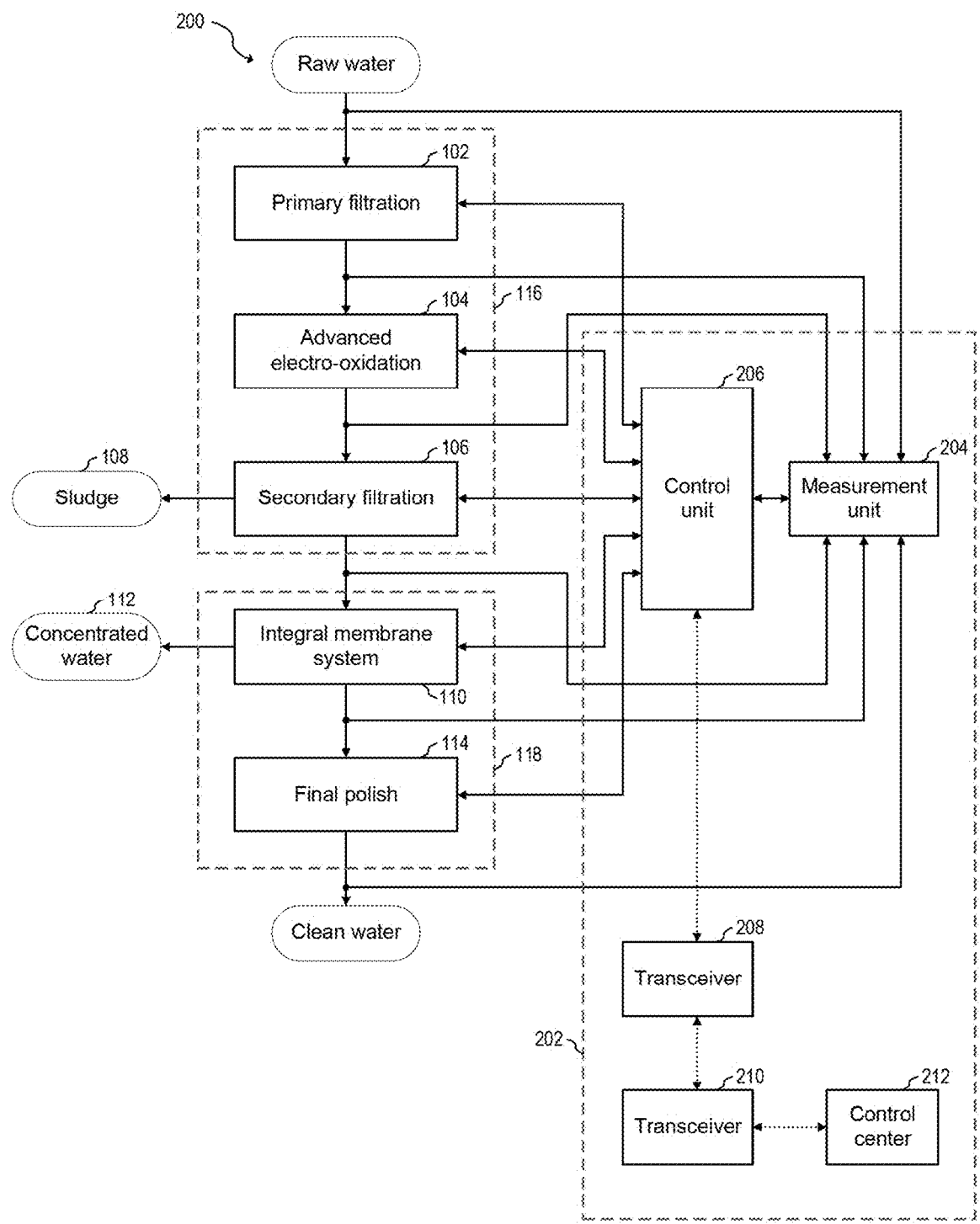
FIG. 2 shows a water treatment system with a control system, in accordance with an embodiment.

Water treatment system 100 may be configurable. Even though manual configuration is possible, water treatment system 100 may be configured dynamically to adapt the system to changing raw water or changes in the desired quality of clean water. FIG. 2 shows water treatment system 200 with control system 202, according to an embodiment of the present invention. Similarly, to water treatment 100, water treatment system 200 includes pre-treatment stage 116 and treatment stage 118. Water treatment system 200, however, includes control system 202, which includes control unit 206, measurement unit 204, transceivers 108 and 210, and control center 212.

During normal operation, control unit 206 may be capable of dynamically changing the configuration of primary filtration stage 102, advanced electro-oxidation stage 104, secondary filtration stage 106, integral membrane system stage no and final polish stage 118. For example, the ozone concentration or the waveform amplitude and shape used in advanced electronic-oxidation stage 104 may be optimized to changing characteristics of the raw water. For example, according to the main measured parameters of interest and target of the quality of the water, the system may be able to bypass one stage or just some elements of each stage, recirculate the influent from one stage to other stage or sub-stage in any order and make the tuning of some parameters, like the special designed waveforms to perform a polish of the water in advanced electronic-oxidation when the water has already passed through all the stages or some of them. The control unit may be able to select which stage to use, i.e. primary filtration stage 102, advanced electro-oxidation stage 104, secondary filtration stage 106, integral membrane system stage no and final polish stage in that order as example, but may also be but not limited to Primary filtration stage 102, advanced electro-oxidation stage 104, secondary filtration stage 106, advanced electro-oxidation stage 104, some sub-stages of integral membrane system stage no and final polish stage or in any order as needed according the quality target of the water.

Measurement unit 204 may be configured to monitor the quality of the raw water and the clean water, as well as the water in between filtering stages. In this case, the quality is measured by sensors in situ (pH, TDS, TSS, Flow, Pressure and Temperature Sensors). Also measured with periodical water analysis by a lab kit (Hardness, Alkalinity, Oils, Sulfides, Chlorides, Heavy metals, etc.). The data collected by measurement unit 204 may be sent to control unit 206 such that control unit 206 dynamically changes the configuration of particular filtering stages to optimize performance. Control unit 206 may also receive information from a particular filter stage, such as a failure flag, and respond accordingly, such as by shutting down the system or by adjusting any pertinent filtering stage.

The method used by control unit 206 to respond to changes in the characteristics of the measured water may rely on a local database, which may be stored locally. The method may be a non-linear control technique and may be implemented using neural control and fuzzy control or any other techniques known in the art.

Control unit 206 and measurement unit 204 may be located near pretreatment stage 116 and treatment stage 118, such as inside the same enclosure or in separated enclosures but both in continuous communication. Transceiver 208 may also be located near pretreatment stage 116 and treatment stage 118 and may be used as a communication link between control unit 206 and control center 212 through transceiver 210.

Control center 212 may be operated manually or may be automated. Control center 212 may obtain measurement information of the quality the water as well as the status of any filtering stage. Control center 212 may configure primary filtration stage 102, advanced electro-oxidation stage 104, secondary filtration stage 106, integral membrane system stage 110 and final polish stage 118, essentially overwriting any setting that control unit 206 may have been using.

In an embodiment, a method includes generating a first water product and a sludge of contaminants from water to be treated using an advanced electronic-oxidation process; separating the sludge of contaminants from the first water; and filtering the first water product through a membrane structure to produce a second water product.

The configurable electrical current includes a waveform, the waveform being at least one of a square-wave shaped waveform, a sawtooth shaped waveform, a pulse-width modulated waveform, or a pulse-amplitude modulated waveform, and wherein the waveform is at least one of a unipolar waveform, a bipolar waveform, or a mounted waveform in a direct current (DC) offset.

Generating the first water product may include introducing a mixture including ozone and water to be treated into a reaction chamber; and passing a configurable electrical current through the mixture to produce the first water product and the sludge of contaminants.

The method may further include conditioning the water to be treated with a pH treatment prior to passing the configurable electrical current through the mixture.

A pH of the first water product may be between about 5 and about 8.

Separating the sludge of contaminants from the first water product includes a filtration process.

The method may further include exposing the second water product to ultraviolet light or ozonation.

The method may further include filtering the water to be treated prior to the advanced electronic-oxidation process.

Filtering the water to be treated may include a liquid-liquid separation process.

In an embodiment, a system includes an advanced electronic-oxidation stage configured to treat raw water and generate a first water product and a sludge of contaminants; a filter configured to separate the sludge of contaminants from the first water product; and a membrane structure configured to filter the first water product to produce a second water product.

The system may be portable.

The system may further include a measurement unit configured to monitor at least one of a quality of the raw water or a quality of the second water product; and a controller communicatively coupled to and configured to vary a parameter of at least one of the advanced electronic-oxidation stage, the filter, or the membrane structure in response to the quality of the raw water or the quality of the second water product.

The measurement unit may be further configured to monitor a performance of at least one of the advanced electronic-oxidation stage, the filter, or the membrane structure, wherein the performance of the advanced electronic-oxidation stage includes a settle rate after the advanced electronic-oxidation stage, the measurement unit being further configured to sample the first water product and the second water product and compare the quality of the first water product and the second water product to a parameter stored in a database.

The controller may be further configured to vary an electrical current provided to the advanced electronic-oxidation stage based on the quality of the raw water.

The measurement unit may include at least one of a pressure sensor or a pH sensor.

In an embodiment, a system includes a water pre-treatment stage and a water treatment stage. The water pre-treatment stage includes a first filter configured to filter raw water; an advanced electronic-oxidation stage configured to treat the raw water and generate a first water product and a sludge of contaminants; and a second filter configured to separate the sludge of contaminants from the first water product. The water treatment stage includes a membrane structure configured to filter the first water product to produce a second water product.

The membrane structure may include a first sub-stage configured to filter the first water product to produce a filtrate, and a second sub-stage configured to produce the second water product from the filtrate.

The first sub-stage may include at least one of a micro-filtration sub-stage or an ultra-filtration sub-stage, wherein the micro-filtration sub-stage is configured to remove particles having a size between about 0.1 micrometers and about 0.35 micrometers, and wherein the ultra-filtration sub-stage is configured to remove particles having a size between about 0.02 micrometers and about 0.05 micrometers.

A pH of the first water product may be between about 5 and about 8.

The second sub-stage may include a reverse-osmosis membrane structure.

The system may further include a controller configured to select an order by which the water pre-treatment stage and the water treatment stage are used; the controller being further configured to select an order by which one or more sub-stages of the water pre-treatment stage or the water treatment stage are used; the controller being further configured to bypass the water pre-treatment stage or the water treatment stage; the controller being further configured to bypass one or more sub-stages of the water pre-treatment stage or one or more sub-stages of the water treatment stage; the controller being further configured to recirculate an influent from one of the water pre-treatment stage or the water treatment stage to another of the water pre-treatment stage or the water treatment stage, or sub-stages thereof; and the controller being further configured to tune one or more parameters of the water pre-treatment stage or the water treatment stage.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   generating a first water product and a sludge of contaminants from water to be treated using an advanced electronic-oxidation process, wherein generating the first water product and the sludge of contaminants using the advanced electronic-oxidation process comprises:
     applying a first electronic treatment to the water to be treated in accordance with an electrocoagulation technique operated in synchronization with ozone,
     applying a second electronic treatment to the water to be treated in accordance with an electro-flocculation technique operated in synchronization with ozone,
     applying a third electronic treatment to the water to be treated in accordance with an electro-chlorinator technique operated in synchronization with ozone, and
     applying a fourth electronic treatment to the water to be treated in accordance with an electro-dialysis technique operated in synchronization with ozone;
   separating the sludge of contaminants from the first water product using a filtration process;
   filtering the first water product to produce a second water product and a concentrated water byproduct, wherein the filtering comprises a first sub-stage to remove particles greater than 0.02 µm to about 0.05 µm followed by a second sub-stage comprising a reverse osmosis process or a nano-filtration process; and
   exposing the second water product to an ultraviolet light treatment or ozonation process to generate clean water.

2. The method of claim 1, wherein generating the first water product comprises:
   introducing a mixture comprising ozone and water to be treated into a reaction chamber; and
   passing a configurable electrical current through the mixture to produce the first water product and the sludge of contaminants.

3. The method of claim 2, wherein the configurable electrical current comprises a waveform, the waveform being at least one of a square-wave shaped waveform, a sawtooth shaped waveform, a pulse-width modulated waveform, or a pulse-amplitude modulated waveform, and wherein the waveform is at least one of a unipolar waveform, a bipolar waveform, or a mounted waveform in a direct current (DC) offset.

4. The method of claim 2, further comprising conditioning the water to be treated with a pH treatment prior to passing the configurable electrical current through the mixture, wherein a pH of the first water product is between about 5 and about 8.

5. The method of claim 1, further comprising:
   filtering the water to be treated prior to the advanced electronic-oxidation process; and
   providing a configurable control signal in parallel for the first electronic treatment, the second electronic treatment, the third electronic treatment, and the fourth electronic treatment.

6. The method of claim 5, wherein filtering the water to be treated comprises a liquid-liquid separation process.

7. A system comprising:
   an advanced electronic-oxidation stage configured to treat raw water and generate a first water product and a sludge of contaminants, wherein generating the first water product and the sludge of contaminants using the advanced electronic-oxidation stage comprises:
     applying a first electronic treatment to treat raw water in accordance with an electrocoagulation technique operated in synchronization with ozone,
     applying a second electronic treatment to treat raw water in accordance with an electro-flocculation technique in synchronization with ozone,
     applying a third electronic treatment to treat raw water in accordance with an electro-chlorinator technique in synchronization with ozone, and
     applying a fourth electronic treatment to treat raw water in accordance with an electro-dialysis technique operated in synchronization with ozone;
   a filter configured to separate the sludge of contaminants from the first water product; and
   an integral membrane system configured to filter the first water product to produce a second water product and a concentrated water byproduct, wherein the integral membrane system comprises a first sub-stage to remove particles greater than 0.02 µm to about 0.05 µm followed by a second sub-stage comprising a reverse osmosis process or a nano-filtration process; and
   a final polish stage configured to expose the second water product to an ultraviolet light treatment or ozonation process to generate clean water.

8. The system of claim 7, wherein the system is portable.

9. The system of claim 7, further comprising:
   a measurement unit configured to monitor at least one of a quality of the raw water or a quality of the second water product; and a controller communicatively coupled to and configured to vary a parameter of at least one of the advanced electronic-oxidation stage, the filter, the integral membrane system, or the final polish stage in response to the quality of the raw water or the quality of the second water product.

10. The system of claim 9, wherein the measurement unit is further configured to monitor a performance of at least one of the advanced electronic-oxidation stage, the filter, the integral membrane system, or the final polish stage, wherein the performance of the advanced electronic-oxidation stage comprises a settle rate after the advanced electronic-oxidation stage, the measurement unit being further configured to sample the first water product and the second water product and compare the quality of the first water product and the second water product to a parameter stored in a database.

11. The system of claim 9, wherein the controller is configured to:
vary an electrical current provided to the advanced electronic-oxidation stage based on the quality of the raw water; and
generate a configurable control signal provided in parallel for the first electronic treatment, the second electronic treatment, the third electronic treatment, and the fourth electronic treatment.

12. The system of claim 9, wherein the measurement unit comprises at least one of a pressure sensor or a pH sensor.

13. A system comprising:
a water pre-treatment stage comprising:
a first filter configured to filter raw water;
an advanced electronic-oxidation stage configured to treat the raw water and generate a first water product and a sludge of contaminants, wherein generating the first water product and the sludge of contaminants using the advanced electronic-oxidation stage comprises:
applying a first electronic treatment to treat the raw water in accordance with an electrocoagulation technique in synchronization with ozone,
applying a second electronic treatment to treat the raw water in accordance with an electro-flocculation technique in synchronization with ozone,
applying a third electronic treatment to treat the raw water in accordance with an electro-chlorinator technique in synchronization with ozone, and
applying a fourth electronic treatment to treat the raw water in accordance with an electro-dialysis technique operated in synchronization with ozone; and
a second filter configured to separate the sludge of contaminants from the first water product;
a water treatment stage configured to filter the first water product to produce clean water and a concentrated water byproduct, wherein the water treatment stage comprises a first sub-stage to remove particles greater than 0.02 µm to about 0.05 µm, the first sub-stage configured to take the first water product and output a filtrate,
a second sub-stage comprising a reverse osmosis process or a nano-filtration process, the second sub-stage configured to take the filtrate and output a second water product,
a final polish stage configured to expose the second water product to an ultraviolet light treatment or ozonation process to generate clean water; and
a controller configured to select an order by which the water pre-treatment stage and the water treatment stage are used.

14. The system of claim 13, wherein the first sub-stage comprises a micro-filtration sub-stage and an ultra-filtration sub-stage, wherein the micro-filtration sub-stage is configured to remove particles having a size between about 0.1 micrometers and about 0.35 micrometers, and wherein the ultra-filtration sub-stage is configured to remove particles having a size between about 0.02 micrometers and about 0.05 micrometers.

15. The system of claim 13, wherein the second sub-stage comprises a reverse-osmosis membrane structure.

16. The system of claim 13, wherein a pH of the first water product is between about 5 and about 8.

17. The system of claim 13, wherein the controller being further configured to:
select an order by which one or more sub-stages of the water pre-treatment stage or the water treatment stage are used; and
generate a configurable control signal provided in parallel for the first electronic treatment, the second electronic treatment, the third electronic treatment, and the fourth electronic treatment.

18. The system of claim 13, wherein the controller is further configured to bypass the water pre-treatment stage or the water treatment stage.

19. The system of claim 13, wherein the controller is further configured to bypass one or more sub-stages of the water pre-treatment stage or one or more sub-stages of the water treatment stage.

20. The system of claim 13, wherein the controller is further configured to
recirculate an influent from one of the water pre-treatment stage or the water treatment stage to another of the water pre-treatment stage or the water treatment stage, or sub-stages thereof; and
tune one or more parameters of the water pre-treatment stage or the water treatment stage.

* * * * *